(12) United States Patent
Boyer

(10) Patent No.: US 8,628,300 B2
(45) Date of Patent: Jan. 14, 2014

(54) APPARATUS AND METHODS FOR COOLING PLATFORM REGIONS OF TURBINE ROTOR BLADES

(75) Inventor: Bradley Taylor Boyer, Greenville, SC (US)

(73) Assignee: General Electric Company, Schenectady, NY (US)

( * ) Notice: Subject to any disclaimer, the term of this patent is extended or adjusted under 35 U.S.C. 154(b) by 405 days.

(21) Appl. No.: 12/981,859

(22) Filed: Dec. 30, 2010

(65) Prior Publication Data

US 2012/0171046 A1 Jul. 5, 2012

(51) Int. Cl.
*F01D 5/08* (2006.01)

(52) U.S. Cl.
USPC ............... 416/97 R; 416/193 A; 29/889.721; 29/527.5; 29/527.6

(58) Field of Classification Search
USPC ........ 415/115, 116, 248; 416/95, 96 R, 97 R, 416/193 A; 29/889.721, 527.5, 527.6
See application file for complete search history.

(56) References Cited

U.S. PATENT DOCUMENTS

| | | | |
|---|---|---|---|
| 5,848,876 A * | 12/1998 | Tomita | 416/96 R |
| 5,915,923 A * | 6/1999 | Tomita et al. | 416/96 R |
| 7,144,215 B2 | 12/2006 | Keith et al. | |
| 7,198,467 B2 | 4/2007 | Keith et al. | |
| 2007/0020100 A1 * | 1/2007 | Beeck et al. | 416/193 A |
| 2011/0236206 A1 * | 9/2011 | Seely | 416/1 |

* cited by examiner

*Primary Examiner* — Edward Look
*Assistant Examiner* — Danielle M Christensen
(74) *Attorney, Agent, or Firm* — Mark E. Henderson; Ernest G. Cusick; Frank A. Landgraff

(57) ABSTRACT

A configuration of cooling channels through the interior of a turbine rotor blade having a platform, wherein the rotor blade includes an airfoil cooling channel that includes a cooling channel formed within the airfoil and an outboard airfoil supply channel. The configuration of cooling channels may include: a platform cooling channel that comprises a cooling channel that traverses at least a portion of the platform, the platform cooling channel having an upstream end and a downstream end; an outboard platform supply channel, which comprises a cooling channel that stretches from a second coolant inlet formed in the root to the upstream end of the platform cooling channel; and an inboard platform return channel, which comprises a cooling channel that stretches from the downstream end of the platform cooling channel to a termination point formed in the root.

17 Claims, 9 Drawing Sheets

APPARATUS AND METHODS FOR COOLING PLATFORM REGIONS OF TURBINE ROTOR BLADES

BACKGROUND OF THE INVENTION

The present application relates generally to combustion turbine engines, which, as used herein and unless specifically stated otherwise, includes all types of combustion turbine engines, such as those used in power generation and aircraft engines. More specifically, but not by way of limitation, the present application relates to apparatus, systems and/or methods for cooling the platform region of turbine rotor blades.

A gas turbine engine typically includes a compressor, a combustor, and a turbine. The compressor and turbine generally include rows of airfoils or blades that are axially stacked in stages. Each stage typically includes a row of circumferentially spaced stator blades, which are fixed, and a set of circumferentially spaced rotor blades, which rotate about a central axis or shaft. In operation, the rotor blades in the compressor are rotated about the shaft to compress a flow of air. The compressed air is then used within the combustor to combust a supply of fuel. The resulting flow of hot gases from the combustion process is expanded through the turbine, which causes the rotor blades to rotate the shaft to which they are attached. In this manner, energy contained in the fuel is converted into the mechanical energy of the rotating shaft, which then, for example, may be used to rotate the coils of a generator to generate electricity.

Referring to FIGS. 1 and 2, turbine rotor blades 100 generally include an airfoil portion or airfoil 102 and a root portion or root 104. The airfoil 102 may be described as having a convex suction face 105 and a concave pressure face 106. The airfoil 102 further may be described as having a leading edge 107, which is the forward edge, and a trailing edge 108, which is the aft edge. The root 104 may be described as having structure (which, as shown, typically includes a dovetail 109) for affixing the blade 100 to the rotor shaft, a platform 110 from which the airfoil 102 extends, and a shank 112, which includes the structure between the dovetail 109 and the platform 110.

In general, the platform 110 is employed on turbine rotor blades 100 to form the inner flow path boundary of the hot gas path section of the gas turbine. The platform 110 further provides structural support for the airfoil 102. In operation, the rotational velocity of the turbine induces mechanical loading that creates highly stressed regions along the platform 110 that, when coupled with high temperatures, ultimately cause the formation of operational defects, such as oxidation, creep, low-cycle fatigue cracking, and others. These defects, of course, negatively impact the useful life of the rotor blade 100. It will be appreciated that these harsh operating conditions, i.e., exposure to extreme temperatures of the hot gas path and mechanical loading associated with the rotating blades, create considerable challenges in designing durable, long-lasting rotor blade platforms 110 that both perform well and are cost-effective to manufacture.

One common solution to make the platform region 110 more durable is to cool it with a flow of compressed air or other coolant during operation, and a variety of these type of platform designs are known. However, as one of ordinary skill in the art will appreciate, the platform region 110 presents certain design challenges that make it difficult to cool in this manner. In significant part, this is due to the awkward geometry of this region, in that, as described, the platform 110 is a periphery component that resides away from the central core of the rotor blade and typically is designed to have a structurally sound, but thin radial thickness.

To circulate coolant, rotor blades 100 typically include one or more hollow cooling passages 116 (see FIGS. 3, 4 and 5) that, at minimum, extend radially through the core of the blade 100, including through the root 104 and the airfoil 102. As described in more detail below, to increase the exchange of heat, such cooling passages 116 may be formed having a serpentine path that winds through the central regions of the blade 100, though other configurations are possible. In operation, a coolant may enter the central cooling passages via one or more inlets 117 formed in the inboard portion of the root 104. The coolant may circulate through the blade 100 and exit through outlets (not shown) formed on the airfoil and/or via one or more outlets (not shown) formed in the root 104. The coolant may be pressurized, and, for example, may include pressurized air, pressurized air mixed with water, steam, and the like. In many cases, the coolant is compressed air that is diverted from the compressor of the engine, though other sources are possible. As discussed in more detail below, these cooling passages typically include a high-pressure coolant region and a low-pressure coolant region. The high-pressure coolant region typically corresponds to an upstream portion of the cooling passage that has a higher coolant pressure, whereas the low-pressure coolant region corresponds to a downstream portion having a relatively lower coolant pressure.

In some cases, the coolant may be directed from the cooling passages 116 into a cavity 119 formed between the shanks 112 and platforms 110 of adjacent rotor blades 100. From there, the coolant may be used to cool the platform region 110 of the blade, a conventional design of which is presented in FIG. 3. This type of design typically extracts air from one of the cooling passages 116 and uses the air to pressurize the cavity 119 formed between the shanks 112/platforms 110. Once pressurized, this cavity 119 then supplies coolant to cooling channels that extend through the platforms 110. After traversing the platform 110, the cooling air may exit the cavity through film cooling holes formed in the topside 113 of the platform 110.

It will be appreciated, however, that this type of conventional design has several disadvantages. First, the cooling circuit is not self-contained in one part, as the cooling circuit is only formed after two neighboring rotor blades 100 are assembled. This adds a great degree of difficulty and complexity to installation and pre-installation flow testing. A second disadvantage is that the integrity of the cavity 119 formed between adjacent rotor blades 100 is dependent on how well the perimeter of the cavity 119 is sealed. Inadequate sealing may result in inadequate platform cooling and/or wasted cooling air. A third disadvantage is the inherent risk that hot gas path gases may be ingested into the cavity 119 or the platform itself 110. This may occur if the cavity 119 is not maintained at a sufficiently high pressure during operation. If the pressure of the cavity 119 falls below the pressure within the hot gas path, hot gases will be ingested into the shank cavity 119 or the platform 110 itself, which typically damages these components as they were not designed to endure exposure to the hot gas-path conditions.

FIGS. 4 and 5 illustrate another type of conventional design for platform cooling. In this case, the cooling circuit is contained within the rotor blade 100 and does not involve the shank cavity 119, as depicted. Cooling air is extracted from one of the cooling passages 116 that extend through the core of the blade 100 and directed aft through cooling channels 120 formed within the platform 110 (i.e., "platform cooling channels 120"). As shown by the several arrows, the cooling air flows through the platform cooling channels 120 and exits through outlets in the aft edge 121 of the platform 110 or from outlets disposed along the suction side edge 122. (Note that in describing or referring to the edges or faces of the rectangular platform 110, each may be delineated based upon its location in relation to the suction face 105 and pressure face 106 of the airfoil 102 and/or the forward and aft directions of the engine once the blade 100 is installed. As such, as one of ordinary skill in the art will appreciate, the platform may include an aft edge 121, a suction side edge 122, a forward edge 124, and a pressure side edge 126, as indicated in FIGS. 3 and 4. In addition, the suction side edge 122 and the pressure side edge 126 also are commonly referred to as "slashfaces" and the narrow cavity formed therebetween once neighboring rotor blades 100 are installed may be referred to as a "slashface cavity".)

It will be appreciated that the conventional designs of FIGS. 4 and 5 have an advantage over the design of FIG. 3 in that they are not affected by variations in assembly or installation conditions. However, conventional designs of this nature have several limitations or drawbacks. First, as illustrated, only a single circuit is provided on each side of the airfoil 102 and, thus, there is the disadvantage of having limited control of the amount of cooling air used at different locations in the platform 110. Second, conventional designs of this type have a coverage area that is generally limited. While the serpentine path of FIG. 5 is an improvement in terms of coverage over FIG. 4, there are still dead areas within the platform 110 that remain uncooled. Third, to obtain better coverage with intricately formed platform cooling channels 120, manufacturing costs increase dramatically, particularly if the cooling channels having shapes that require a casting process to form. Fourth, these conventional designs typically dump coolant into the hot gas path after usage and before the coolant is completely exhausted, which negatively affects the efficiency of the engine. Fifth, conventional designs of this nature generally have little flexibility. That is, the channels 120 are formed as an integral part of the platform 110 and provide little or no opportunity to change their function or configuration as operating conditions vary. In addition, these types of conventional designs are difficult to repair or refurbish.

In addition, as one of ordinary skill in the art will appreciate, another challenge associated with these types of cooling arrangements is the connection that is often required between the platform cooling circuit, i.e., the cooling passages formed through the interior of the platform, and the main cooling circuit, i.e., the interior cooling passages formed through the interior of the root and airfoil. One reason for this is that the connection required typically must be formed through a high-stress region of the blade. As such, forming the connection as part of a post-cast machining process may create stress concentrations that are unacceptable. However, forming the connection as part of the casting process requires that the core of the platform cooling circuit must be connected to the core of the main cooling circuit during the casting process, which typically is not desirable. Typically, as one of ordinary skill in the art will appreciate, the platform cooling circuit has tight tolerance requirements associated with the placement of the interior cooling passages in relation to the outer surface of the platform. Because of its length, the core of the main cooling circuit is apt to move when the mold is filled during the casting process. This movement, while acceptable for the placement of the main cooling circuit, makes it difficult to satisfy the tight placement tolerances of the platform cooling circuit if the movement of the main core is translated to the platform core. Having the two cores remain unconnected through the casting process means the movement of the main core does not affect the ultimate placement of the platform cooling circuit.

Conventional platform cooling designs fail to satisfy these important requirements. There remains a need for improved apparatus, systems, and methods that effectively cool the platform region of turbine rotor blades in an efficient manner, while also being cost-effective to construct, flexible in application, structurally sound, and durable.

BRIEF DESCRIPTION OF THE INVENTION

The present application thus describes a configuration of cooling channels through the interior of a turbine rotor blade having a platform at an interface between an airfoil and a root, wherein the rotor blade includes an airfoil cooling channel that includes a cooling channel formed within the airfoil and an outboard airfoil supply channel, which comprises a coolant supply channel that stretches from a first coolant inlet formed through the root to a connection with the airfoil cooling channel. In one embodiment, the configuration of cooling channels includes: a platform cooling channel that comprises a cooling channel that traverses at least a portion of the platform, the platform cooling channel having an upstream end and a downstream end; an outboard platform supply channel, which comprises a cooling channel that stretches from a second coolant inlet formed in the root to the upstream end of the platform cooling channel; and an inboard platform return channel, which comprises a cooling channel that stretches from the downstream end of the platform cooling channel to a termination point formed in the root.

The present application further describes a configuration of cooling channels through the interior of a turbine rotor blade having a platform at an interface between an airfoil and a root, wherein, along an inner radial portion, the root comprises a dovetail that is configured to engage a rotor wheel, and, along an outer radial portion, the root comprises a shank that extends between the dovetail and the platform, wherein the turbine rotor blade includes an airfoil cooling channel formed within the airfoil that includes an outboard airfoil supply channel, which comprises a cooling channel that stretches from a first coolant inlet formed through an inner radial surface of the dovetail to an upstream end of the airfoil cooling channel; and a platform cooling channel which is configured to direct coolant through at least a portion of the interior of the platform, the platform cooling channel having an upstream end and a downstream end. In such embodiments, the configuration of cooling channels may include: an outboard platform supply channel, which comprises a cooling channel that stretches from a second coolant inlet formed though the inner radial surface of the dovetail to the upstream end of the platform cooling channel; and an inboard platform return channel, which comprises a cooling channel that stretches from the downstream end of the platform cooling channel to a connector formed in proximity to the inner radial surface of the dovetail; wherein the connector connects the outboard airfoil supply channel and the inboard platform return channel.

The present application further describes a method of creating a configuration of cooling channels in a turbine rotor blade having a platform at an interface between an airfoil and a root, wherein, along an inner radial portion, the root comprises a dovetail that is configured to engage a rotor wheel, and, along an outer radial portion, the root comprises a shank that extends between the dovetail and the platform. In some embodiments, the method includes the steps of: forming an airfoil cooling circuit that includes an outboard airfoil supply channel and an airfoil cooling channel, wherein the outboard airfoil supply channel comprises a cooling channel that stretches from a first coolant inlet formed through an inner radial surface of the dovetail to an upstream end of the airfoil cooling channel, and the airfoil cooling channel comprises a channel that is configured to direct coolant through at least a portion of the platform; forming a platform cooling circuit that includes an outboard platform supply channel, a platform cooling channel, and an inboard platform return channel, wherein the platform cooling channel is a channel that is configured to direct coolant through at least a portion of the platform, the platform cooling channel having an upstream end and a downstream end, and the outboard platform supply channel comprises a cooling channel that stretches from a second coolant inlet formed though the inner radial surface of the dovetail to the upstream end of the platform cooling channel, and the inboard platform return channel comprises a cooling channel that stretches from the downstream end of the platform cooling channel to an opening formed through the inner radial surface of the dovetail; and in proximity to the inner radial surface of the dovetail, forming a connector that connects the outboard airfoil supply channel and the inboard platform return channel.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
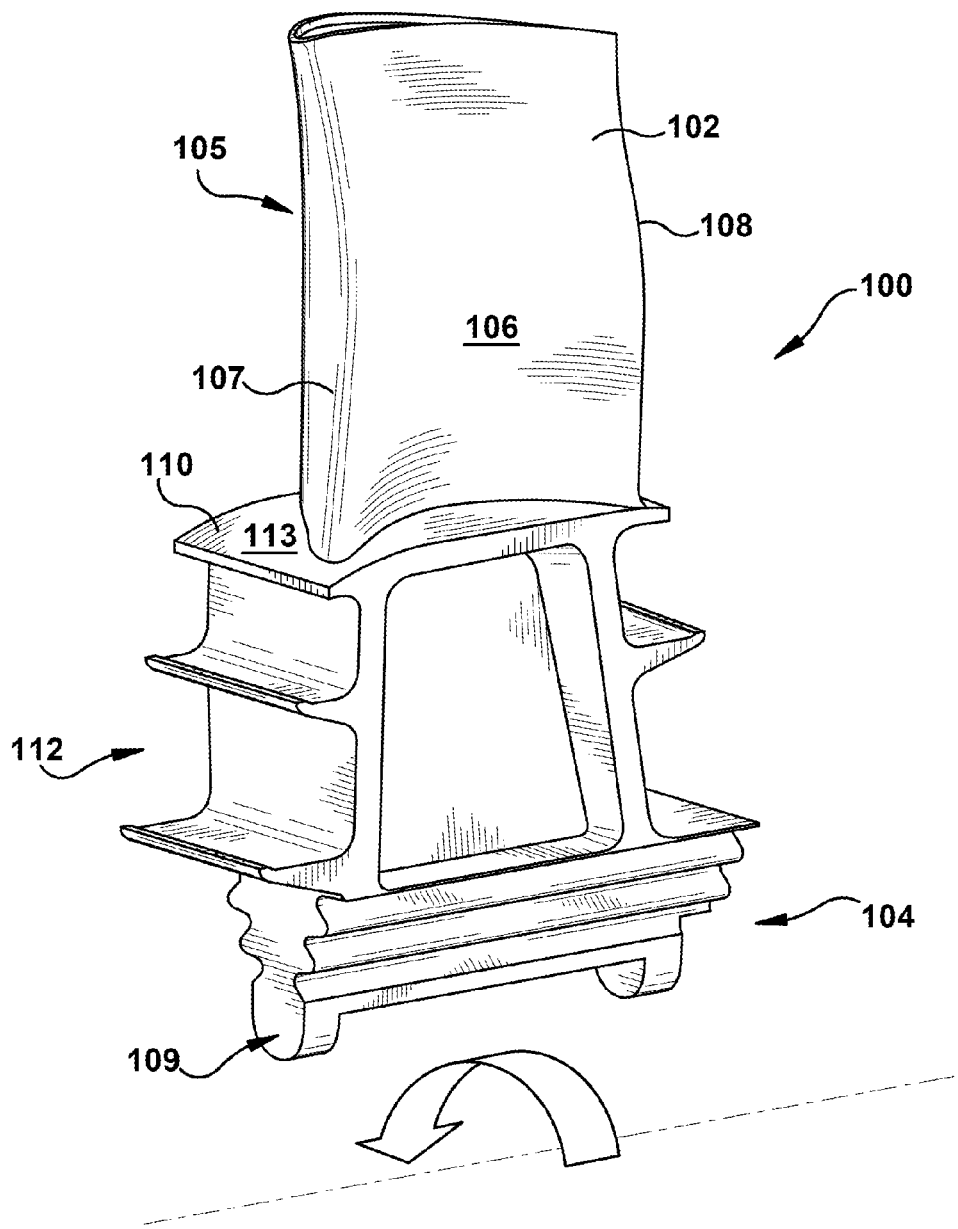
FIG. 1 illustrates a perspective view of an exemplary turbine rotor blade in which embodiments of the present invention may be employed.
Figure 2:
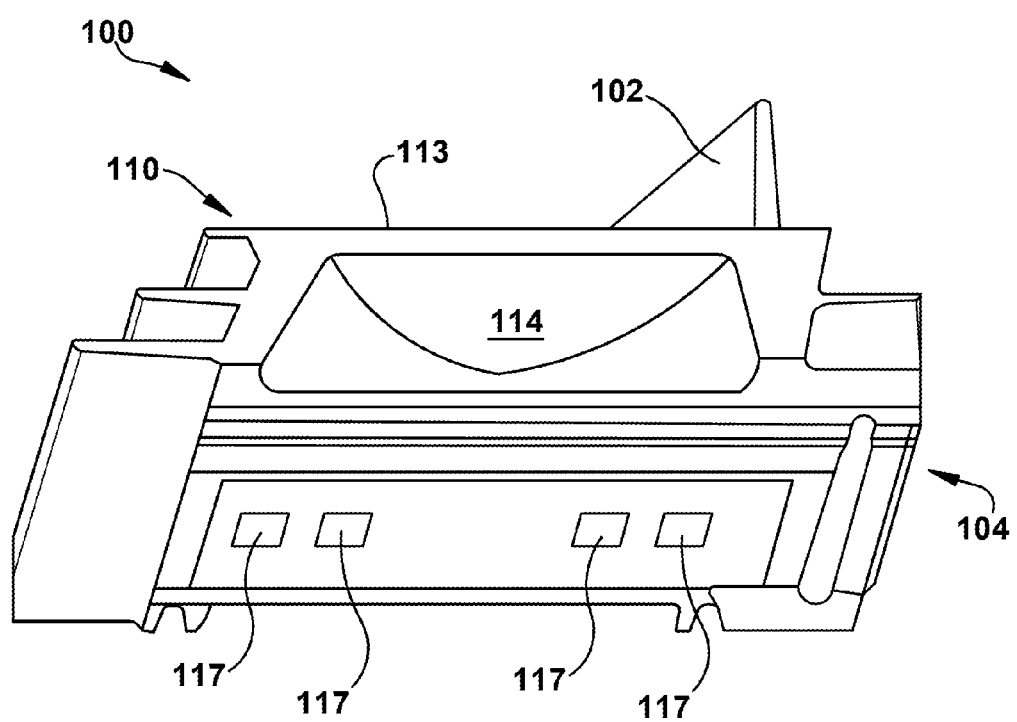
FIG. 2 illustrates an underside view of a turbine rotor blade in which embodiments of the present invention may be used.
Figure 3:
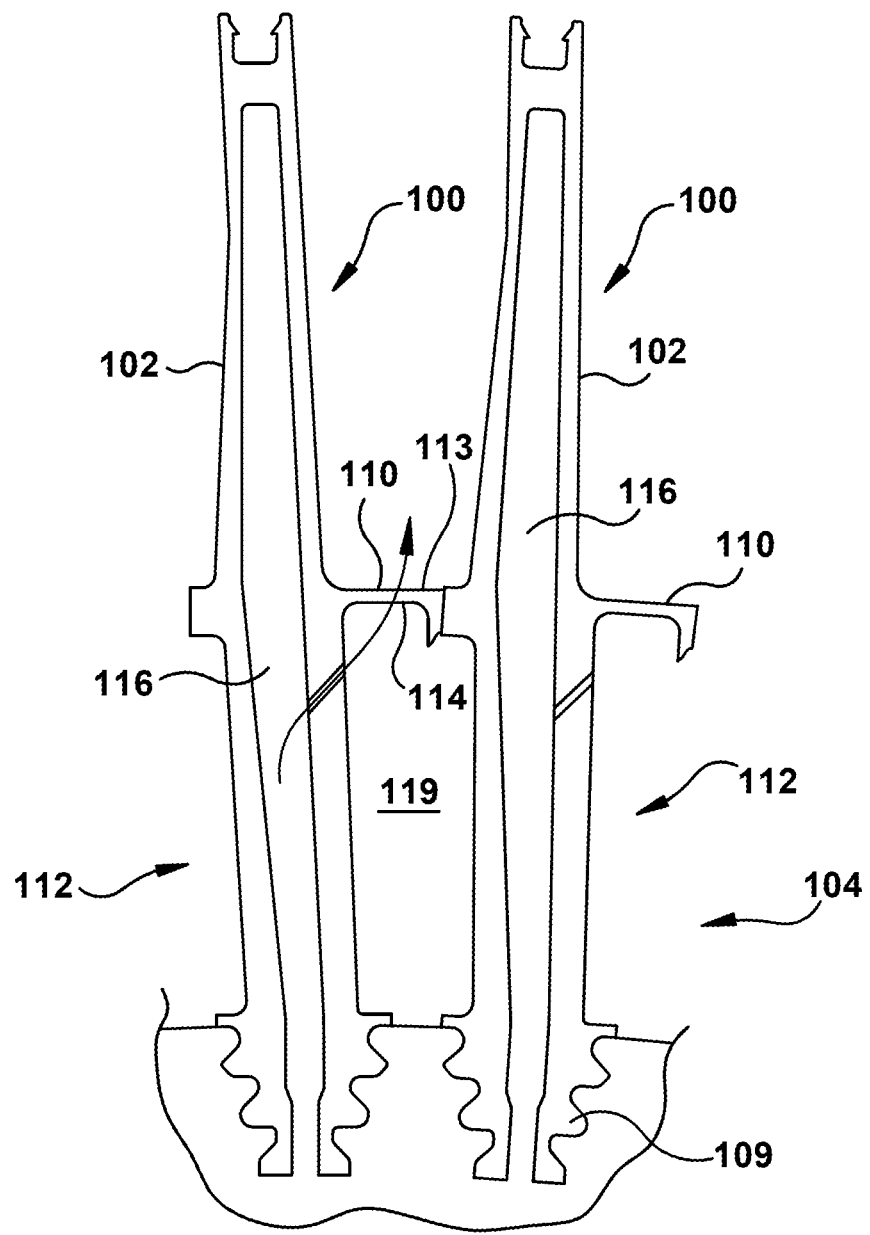
FIG. 3 illustrates a sectional view of neighboring turbine rotor blades having a cooling system according to conventional design.
Figure 4:
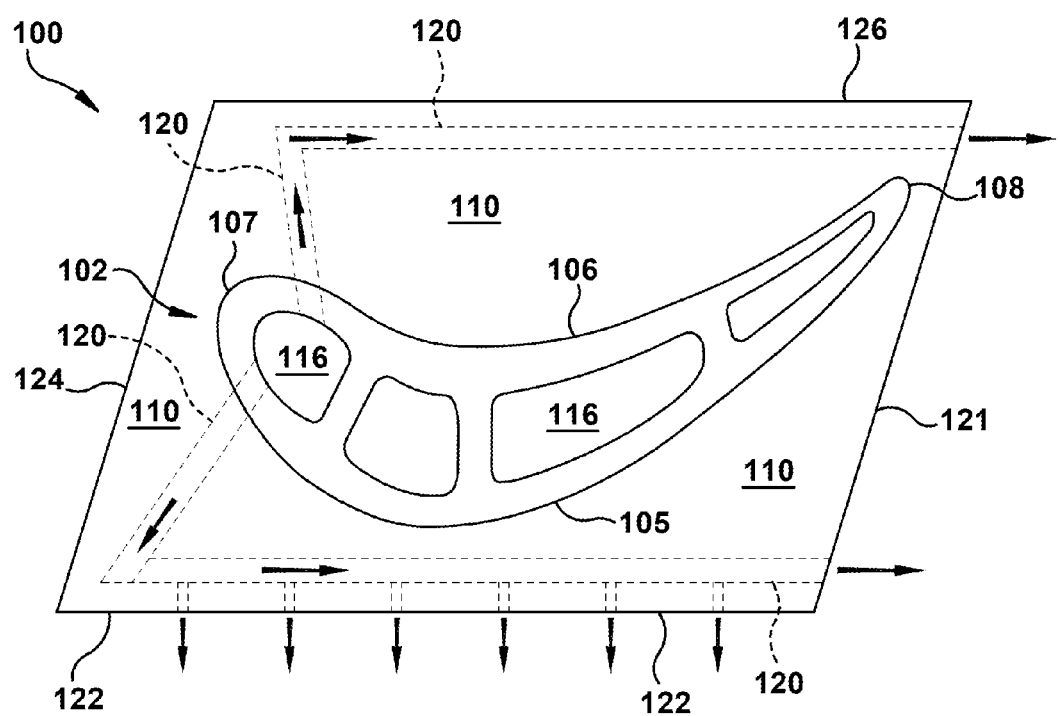
FIG. 4 illustrates a top view of a turbine rotor blade having a platform with interior cooling channels according to conventional design.
Figure 5:
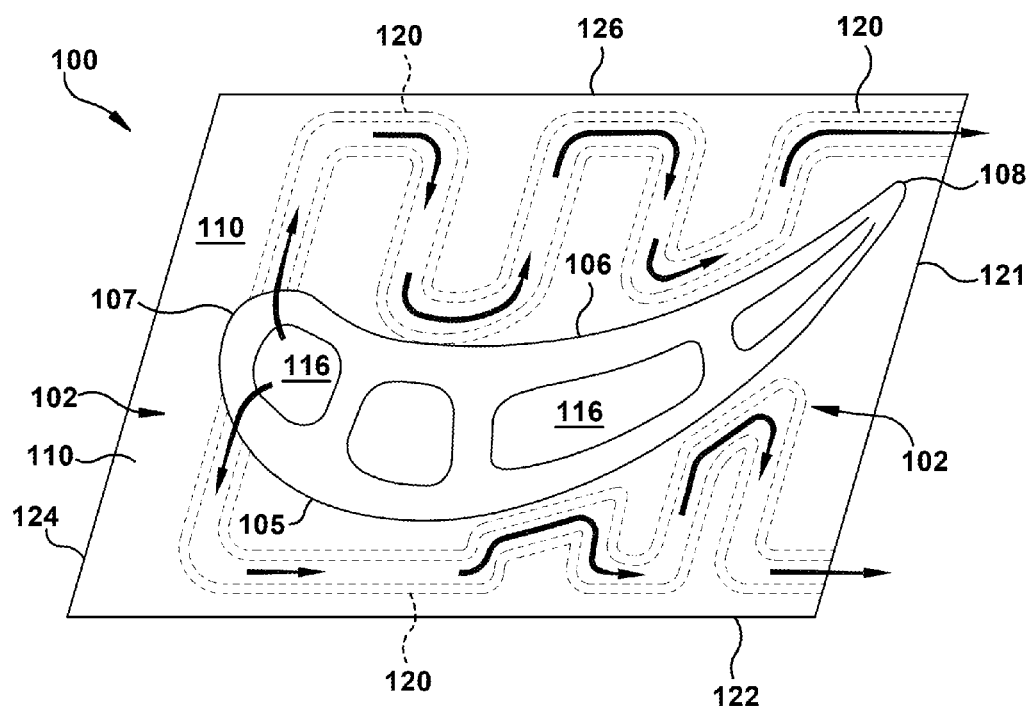
FIG. 5 illustrates a top view of a turbine rotor blade having a platform with interior cooling channels according to an alternative conventional design.
Figure 6:
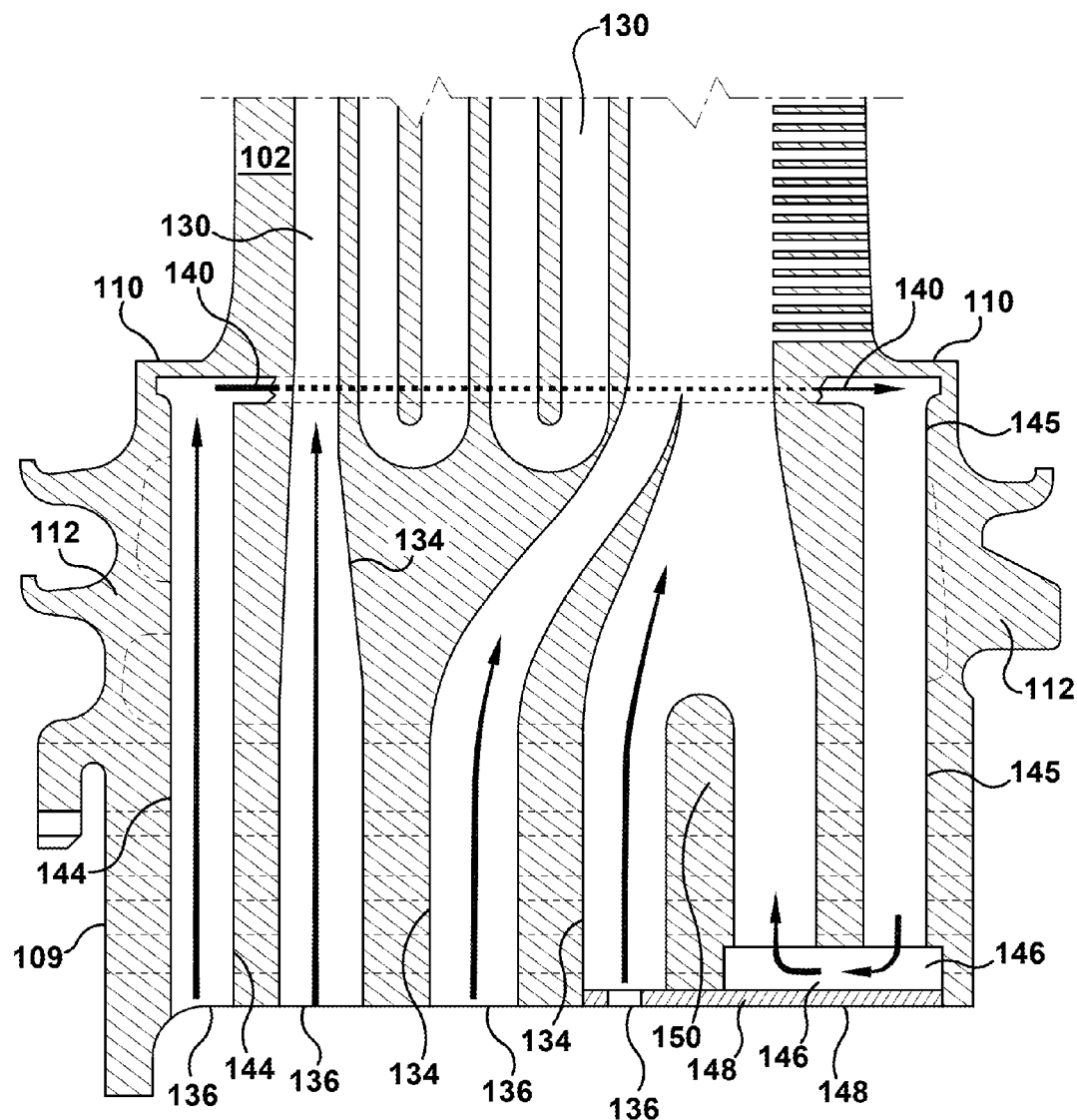
FIG. 6 illustrates a side view of a turbine rotor blade and platform cooling configuration according to an exemplary embodiment of the present invention.

Referring now to FIGS. 6 through 13, several embodiments of the present invention are provided. As shown in FIG. 6, the present invention may include a configuration of cooling channels through the interior of a turbine rotor blade 100. The present invention may be employed in a turbine rotor blade having a platform 110 at the interface between an airfoil 102 and a root 104. It will be appreciated that, along an inner radial portion, the root 104 may comprise a mechanical attachment that is configured to engage a turbine wheel. Typically, the mechanical attachment is a dovetail 109 that inserts into a slot formed in the turbine wheel. Along an outer radial portion, the root 104 generally includes a shank 112 that extends between the dovetail 109 and the platform 110.

The turbine rotor blade 100 also may include an airfoil cooling channel 130. The airfoil cooling channel 130 may include an interior channel that directs or channels coolant through any portion of the airfoil 102. The airfoil cooling channel 130 may include an outboard airfoil supply channel 134, which may be configured to supply coolant to the airfoil cooling channel 130 from a coolant inlet 136 that is typically formed in the root 104 or dovetail 109 of the rotor blade 100. More specifically, the coolant inlet 136 may be formed through the inner radial surface 138 of the dovetail 109. It will be appreciated that the outboard airfoil supply channel 134 may be referred to in this manner because it generally channels a supply of coolant in the outboard direction from the root 104 to the airfoil 102 of the rotor blade 100. The outboard airfoil supply channel 134 and the airfoil cooling channel 130 also may be referred to as the airfoil cooling circuit.

Figure 11:
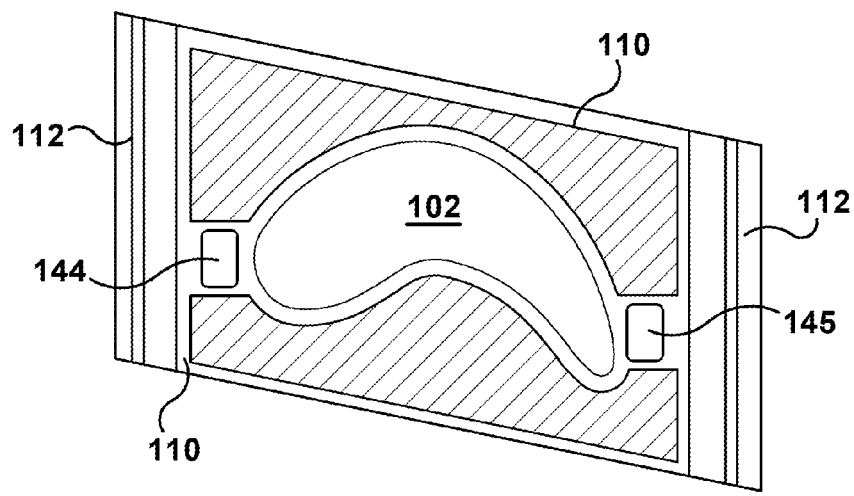
FIG. 11 illustrates a view from an outboard position of a turbine rotor blade showing the location of where platform cooling channels may be located according to an alternative embodiment of the present invention.
Figure 12:
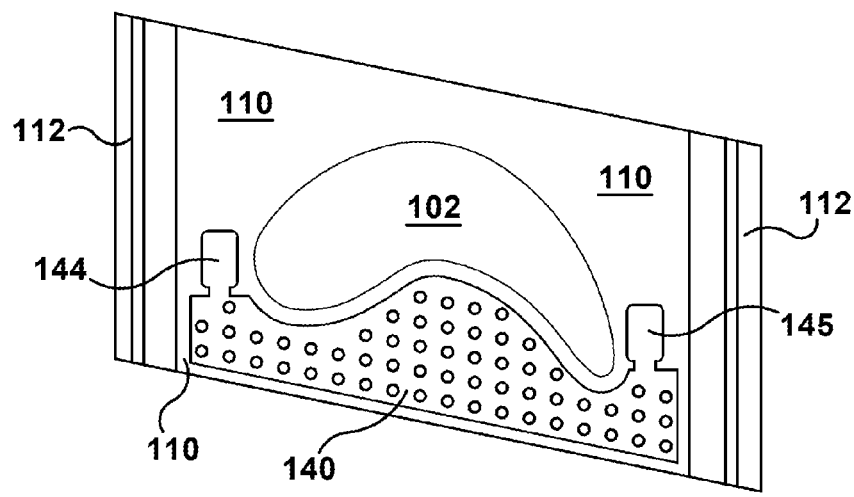
FIG. 12 illustrates a view from an outboard position of a turbine rotor blade having a exemplary platform cooling channel according to an alternative embodiment of the present invention.
Figure 13:
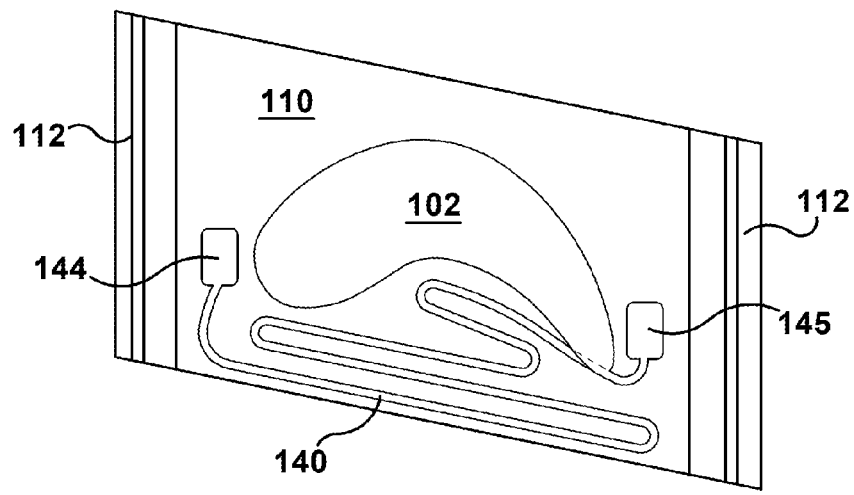
FIG. 13 illustrates a view from an outboard position of a turbine rotor blade having a exemplary platform cooling channel according to an alternative embodiment of the present invention.

The rotor blade 100 may further include a platform cooling channel 140 which is configured to direct or channel coolant through at least a portion of the interior of the platform 110. As illustrated in FIGS. 11, 12 and 13, the platform cooling channel 140 may have a variety of configurations, which typically will be located within the shaded regions of FIG. 11. One exemplary configuration, as shown in FIG. 12, includes a chamber with an array of pins. Another exemplary configuration, as shown in FIG. 13, includes a winding, serpentine path. It will be appreciated that the platform cooling channel 140 may have an upstream end 141 and a downstream end 142.

As illustrated, an outboard platform supply channel 144 may be provided. The outboard platform supply channel 144, as shown, includes an interior cooling channel that extends in the outboard direction from a coolant inlet 136 that, for example, may be formed though the inner radial surface of the dovetail 109. The outboard platform supply channel 144 may extend to the upstream end 141 of the platform cooling channel 140. According to embodiments of the present invention, an inboard platform return channel 145 also may be provided. The inboard platform return channel 145, as shown, includes an interior cooling channel that extends in an inboard direction from the downstream end 142 of the platform cooling channel 140 a termination point, which may include a connection to a connector 146. It will be appreciated that other configurations are also possible, as illustrated in FIGS. 7 through 10.

Figure 10:
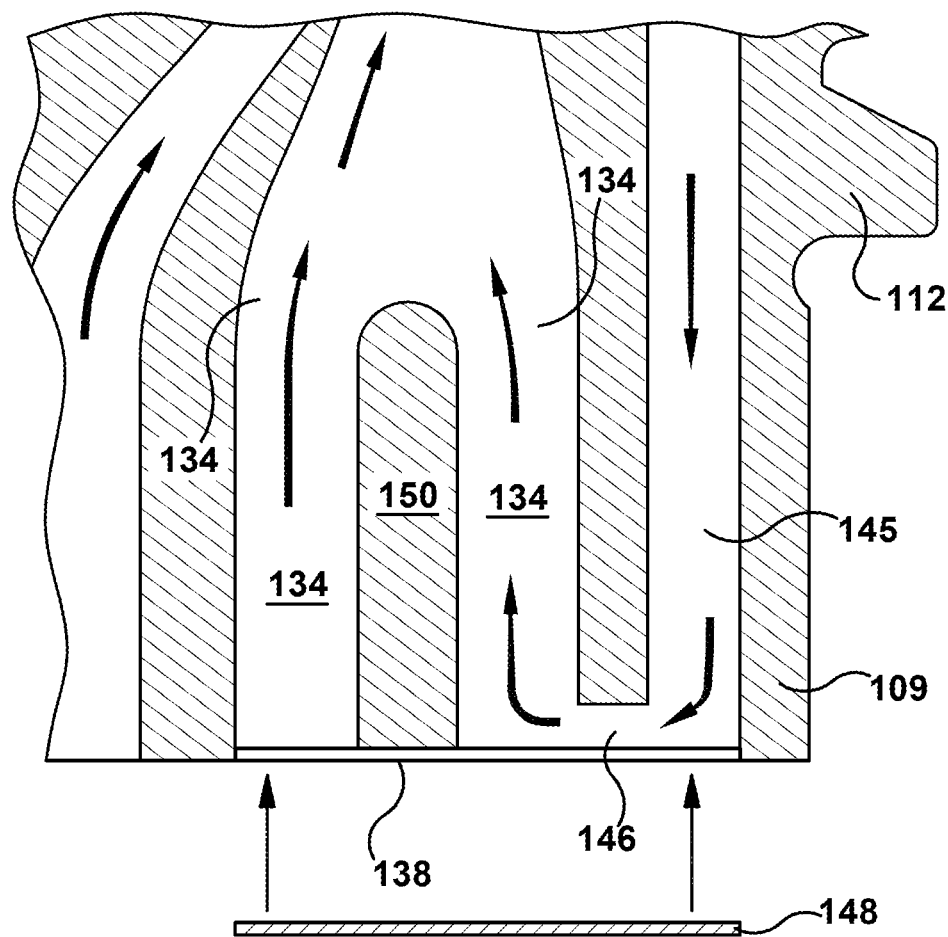
FIG. 10 illustrates a side view of a connector in a dovetail of the turbine rotor blade according to an alternative embodiment of the present invention.

In one embodiment, the connector 146 comprises a channel that is machined through the inner radial surface 138 of the dovetail 109 and subsequently enclosed via a cover plate 148. This configuration is depicted in FIG. 10, with the cross-hatched region representing the region that would be machined to create the connector 146 as well as a depressed area such that the coverplate 148 may be flush in relation to the surface of the dovetail 109.

It will be appreciated that the connector 146 forms a connection between the outboard airfoil supply channel 134 and the inboard platform return channel 145. In this manner, separately formed cooling circuits may be efficiently and effectively created and later connected, the connection for which may be tuned to suit changing or unexpected conditions. Specifically, as discussed above, an airfoil cooling circuit that includes the outboard airfoil supply channel 134 and the airfoil cooling channel 130 may be formed. Separate and unconnected to this, a platform cooling circuit that includes the outboard platform supply channel 144, the platform cooling channel 140, and the inboard platform return channel 145 may be formed. As described above, those of ordinary skill in the art will appreciate that forming these two circuits so that they may have unconnected cores through the casting process has certain advantages.

Figure 7:
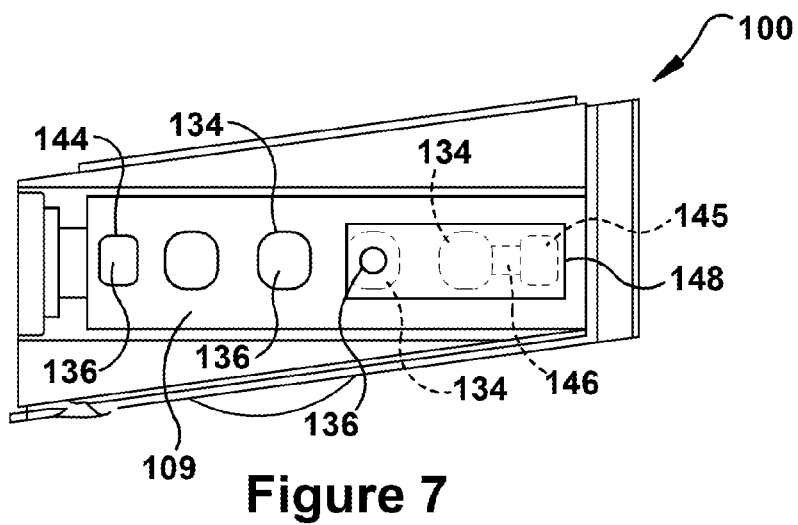
FIG. 7 illustrates a view from an inboard position of a dovetail of a turbine rotor blade and platform cooling configuration according to an exemplary embodiment of the present invention.
Figure 8:
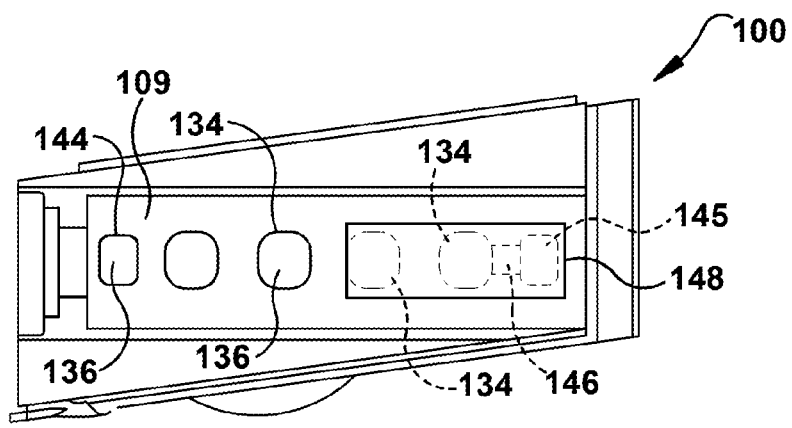
FIG. 8 illustrates a view from an inboard position of a dovetail of a turbine rotor blade and platform cooling configuration according to an exemplary embodiment of the present invention.
Figure 9:
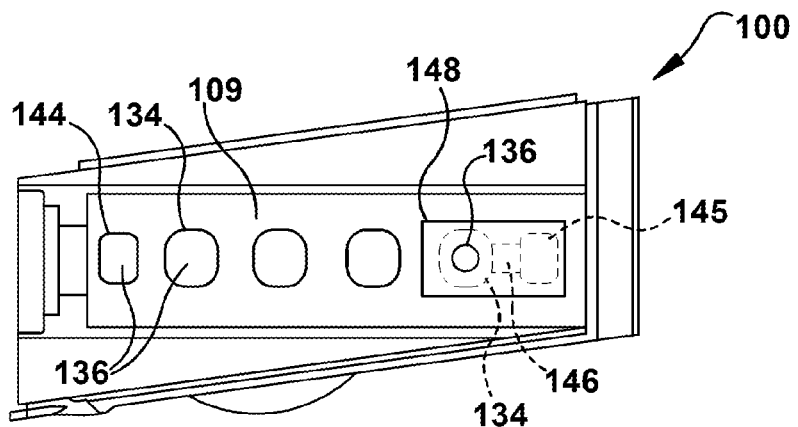
FIG. 9 illustrates a view from an inboard position of a dovetail of a turbine rotor blade and platform cooling configuration according to an exemplary embodiment of the present invention.

As one of ordinary skill in the art will appreciate, in one embodiment, the inboard platform return channel 145 may be configured to direct all coolant flowing through it into the connector 146. The connector 146 then may direct all of the coolant flowing into it from the inboard platform return channel 145 into the outboard airfoil supply channel 134. In this manner, substantially all the coolant that is used to cool the platform then may be reused in the airfoil cooling channel 130. As shown in FIGS. 7 through 9, the coverplate 148 may include a coolant inlet 136, depending on desired characteristics. It will be appreciated that, to prevent backflow, the inlet 136 formed through the cover plate 148 may be metered such that desired flow patterns are achieved. In such cases, the metered inlet 136 may have a reduced cross-sectional area, as shown in FIGS. 7 and 9.

As stated, the connecting means may be a dovetail connection 109. The connector 146 may be a channel that is enclosed by an outer wall. In this case, a first side of the outer wall may be one of the interior walls of the connector 146 and a second, opposing side of the outer wall may form the outer surface of the dovetail 109. In this case, the connector 146 may be located in proximity to the inboard edge of the dovetail 109.

As illustrated in FIG. 6, the outer wall of the connector may be referred to as a coverplate 148. It will be appreciated that the coverplate 148 may be formed as a non-integral component in relation to the dovetail 109. In certain embodiments, as shown in FIGS. 7 and 9, the coverplate 148 also may have the coolant inlet 136 that serves the outboard airfoil supply channel 134 formed through it. It will be appreciated that the coolant inlet 136 may be configured based upon achieving a desired level of flow through it, as described above.

As shown in FIG. 6, the outboard airfoil supply channel 134 may include a divider 150 that separates the outboard airfoil supply channel 134 into two channels: a) a first outboard airfoil supply channel 134 that is in fluid communication with connector 146; and b) a second outboard airfoil supply channel 134 that is in fluid communication with the coolant inlet 136. As shown, once beyond the divider 150, the first outboard airfoil supply channel 134 may merge with the second outboard airfoil supply channel 134. More specifically, the divider 150 may extend a predetermined distance in the radial direction such that the first outboard airfoil supply channel 134 merges with the second outboard airfoil supply channel 134 at a radial position within the shank 112.

The present invention further includes a configuration of cooling channels through the interior of a turbine rotor blade 100 having a platform 110 at an interface between an airfoil 102 and a root 104, wherein, along an inner radial portion, the root 104 comprises a dovetail 109 that is configured to engage a rotor wheel, and, along an outer radial portion, the root 104 comprises a shank 112 that extends between the dovetail 109 and the platform 110, wherein the turbine rotor blade 100 further includes an airfoil cooling channel 130 that includes a cooling channel formed within the airfoil 102 and an outboard airfoil supply channel 134, which comprises a cooling channel that stretches in an outboard direction from a first coolant inlet 136 formed through an inner radial surface 138 of the dovetail 109 to an upstream end of the cooling channel formed in the airfoil 102. The configuration of the present invention may further include a platform cooling channel 140 which is configured to direct coolant through at least a portion of the interior of the platform 110. The platform cooling channel 140 generally has an upstream end and a downstream end, relative to the direction of flow as indicated by the arrows of FIG. 6. The configuration of cooling channels may further include an outboard platform supply channel 144, which comprises a cooling channel that stretches from a second coolant inlet 136 formed though the inner radial surface of the dovetail 109 to the upstream end of the platform cooling channel 140, and an inboard platform return channel 145, which comprises a cooling channel that stretches from the downstream end of the platform cooling channel 140 to a plenum or connector 146 formed in proximity to the inner radial surface 138 of the dovetail 109. The connector 146 may be configured to connect the outboard airfoil supply channel 134 and the inboard platform return channel 145. In and preferred embodiment, the inboard platform return channel 145 may be configured to direct all coolant flowing therethrough into the connector 146, and the connector 146 may be configured to direct all coolant flowing therethrough into the outboard airfoil supply channel 134.

The present invention further includes a method of creating a configuration of cooling channels in a turbine rotor blade 100 having a platform 110 at an interface between an airfoil 102 and a root 104. The method may include the steps of: a) forming an airfoil cooling circuit that includes an outboard airfoil supply channel 134 and an airfoil cooling channel 130. The outboard airfoil supply channel 134 may be a cooling channel that stretches from a coolant inlet 136 formed through an inner radial surface 138 of the dovetail 109 to an upstream end of the airfoil cooling channel 130; and b) forming a platform cooling circuit that includes an outboard platform supply channel 144, a platform cooling channel 140, and an inboard platform return channel 145. The platform cooling channel 140 may be a channel that is configured to direct coolant through at least a portion of the platform 110, and may include an upstream end 141 and a downstream end 142. The outboard platform supply channel 144 may be a cooling channel that stretches from a coolant inlet 136 formed though the inner radial surface 138 of the dovetail 109 to the upstream end 141 of the platform cooling channel 120. The inboard platform return channel 145 may include a cooling channel that stretches from the downstream end 142 of the platform cooling channel 140 to termination point or connection with a connector 146.

The method may further include the step of forming a connector 146 that connects the outboard airfoil supply channel 134 and the inboard platform return channel 145. The connector 146 may be located in proximity to the inner radial surface 138 of the dovetail 109. In some embodiments, the platform cooling circuit and the airfoil cooling circuit may be formed such that the each circuit does not communicate with the other until the connector 146 is formed.

In a preferred embodiment, the platform cooling circuit and the airfoil cooling circuit may be formed via a casting process, and the connector 146 may be formed via a post-casting machining process. In such cases, the connector 146 may comprise an open channel or groove that is machined through the inner radial surface 138 of the dovetail 109 such that the channel connects the coolant inlet 136 and the opening formed at the termination point of the inboard platform supply channel 144. The method may further include the step of affixing a coverplate 148 over the connector channel such that the connector channel is substantially enclosed.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes, and modifications. Such improvements, changes, and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

I claim:

1. A configuration of cooling channels through the interior of a turbine rotor blade having a platform at an interface between an airfoil and a root, wherein the rotor blade includes an airfoil cooling channel that includes a cooling channel formed within the airfoil and an outboard airfoil supply channel, which comprises a coolant supply channel that stretches from a first coolant inlet formed through the root to a connection with the airfoil cooling channel;

the configuration of cooling channels comprising:
a platform cooling channel that comprises a cooling channel that traverses at least a portion of the platform, the platform cooling channel having an upstream end and a downstream end;
an outboard platform supply channel, which comprises a cooling channel that stretches from a second coolant inlet formed in the root to the upstream end of the platform cooling channel;
an inboard platform return channel, which comprises a cooling channel that stretches from the downstream end of the platform cooling channel to a termination point formed in the root;
wherein the root comprises an inboard portion that includes a connecting means and an outboard portion that extends between the connecting means and the platform;
wherein the first coolant inlet, the second coolant inlet and the termination point of the inboard platform return channel are located within the connecting means;
wherein the outboard platform supply channel, the platform cooling channel, and the inboard platform return channel comprise a platform cooling circuit;
wherein the outboard airfoil supply channel and the airfoil cooling channel comprise an airfoil cooling circuit;
a separating structure that separates the platform cooling circuit from the airfoil cooling circuit at radial positions outboard of the connecting mean; and a connector formed in the connecting means;
wherein the connector comprises a channel that connects the termination point of the inboard platform return channel to the outboard airfoil supply channel.

2. The configuration of cooling channels according to claim 1, wherein the connecting means comprises a dovetail; wherein the connector comprises a channel that is enclosed by an outer wall;
wherein a first side of the outer wall comprises an interior wall of the connector and a second side of the outer wall forms the outer surface of the dovetail; and
wherein the connector is located in proximity to the inboard edge of the dovetail.

3. The configuration of cooling channels according to claim 2, wherein the outer wall of the connector comprises a coverplate, the coverplate comprising a non-integral component in relation to the dovetail.

4. The configuration of cooling channels according to claim 3, wherein the coverplate comprises the first coolant inlet formed therethrough; and
wherein the first coolant inlet is configured based upon a desired metering characteristic.

5. The configuration of cooling channels according to claim 2, wherein the outboard airfoil supply channel comprises a divider that separates the outboard airfoil supply channel into two channels: a) a first outboard airfoil supply channel that is in fluid communication with the connector; and b) a second outboard airfoil supply channel that is in fluid communication with the first inlet;
wherein, beyond the divider, the first outboard airfoil supply channel merges with the second outboard airfoil supply channel; and
wherein the divider extends a predetermined distance in the radial direction such that the first outboard airfoil supply channel merges with the second outboard airfoil supply channel at a radial position within the shank.

6. The configuration of cooling channels according to claim 2, wherein:
the upstream end of the platform cooling channel comprises the approximate radial height of the platform;
the second coolant inlet aligns with the upstream end of the platform cooling channel such that the outboard platform supply channel extends radially between the connection with each;
the downstream end of the platform cooling channel comprises the approximate radial height of the platform; and
the downstream end of the platform cooling channel aligns with the termination point of the inboard platform return channel such that the inboard platform return channel extends radially between each.

7. A configuration of cooling channels through the interior of a turbine rotor blade having a platform at an interface between an airfoil and a root, wherein, along an inner radial portion, the root comprises a dovetail that is configured to engage a rotor wheel, and, along an outer radial portion, the root comprises a shank that extends between the dovetail and the platform, wherein the turbine rotor blade includes an airfoil cooling channel formed within the airfoil that includes an outboard airfoil supply channel, which comprises a cooling channel that stretches from a first coolant inlet formed through an inner radial surface of the dovetail to an upstream end of the airfoil cooling channel; and a platform cooling channel which is configured to direct coolant through at least a portion of the interior of the platform, the platform cooling channel having an upstream end and a downstream end; the configuration of cooling channels comprising:

an outboard platform supply channel, which comprises a cooling channel that stretches from a second coolant inlet formed though the inner radial surface of the dovetail to the upstream end of the platform cooling channel; and an inboard platform return channel, which comprises a cooling channel that stretches from the downstream end of the platform cooling channel to a connector formed in proximity to the inner radial surface of the dovetail;

wherein the connector connects the outboard airfoil supply channel and the inboard platform return channel.

8. The configuration of cooling channels according to claim 7, wherein the outboard platform supply channel, the platform cooling channel, and the inboard supply channel comprise a platform cooling circuit;

wherein the outboard airfoil supply channel and the airfoil cooling channel comprise an airfoil cooling circuit; and further comprising a separating structure that separates the platform cooling circuit from the airfoil cooling circuit at radial positions outboard of the dovetail.

9. The configuration of cooling channels according to claim 8, wherein the inboard platform return channel is configured to direct all coolant flowing therethrough into the connector; and wherein the connector is configured to direct all coolant flowing therethrough into the outboard airfoil supply channel.

10. The configuration of cooling channels according to claim 9, wherein the connector comprises a channel that is enclosed by an outer wall, the outer wall forming a portion of the inner radial surface of the dovetail.

11. The configuration of cooling channels according to claim 10, wherein the outer wall of the connector comprises a coverplate, the coverplate comprising a non-integral component in relation to the dovetail.

12. A method of creating a configuration of cooling channels in a turbine rotor blade having a platform at an interface between an airfoil and a root, wherein, along an inner radial portion, the root comprises a dovetail that is configured to engage a rotor wheel, and, along an outer radial portion, the root comprises a shank that extends between the dovetail and the platform, the method comprising the steps of:

forming an airfoil cooling circuit that includes an outboard airfoil supply channel and an airfoil cooling channel, wherein the outboard airfoil supply channel comprises a cooling channel that stretches from a first coolant inlet formed through an inner radial surface of the dovetail to an upstream end of the airfoil cooling channel, and the airfoil cooling channel comprises a channel that is configured to direct coolant through at least a portion of the platform;

forming a platform cooling circuit that includes an outboard platform supply channel, a platform cooling channel, and an inboard platform return channel, wherein the platform cooling channel is a channel that is configured to direct coolant through at least a portion of the platform, the platform cooling channel having an upstream end and a downstream end, and the outboard platform supply channel comprises a cooling channel that stretches from a second coolant inlet formed though the inner radial surface of the dovetail to the upstream end of the platform cooling channel, and the inboard platform return channel comprises a cooling channel that stretches from the downstream end of the platform cooling channel to an opening formed through the inner radial surface of the dovetail; and in proximity to the inner radial surface of the dovetail, forming a connector that connects the outboard airfoil supply channel and the inboard platform return channel.

13. The method according to claim 12, wherein the platform cooling circuit and the airfoil cooling circuit are formed such that each circuit does not fluidly communicate with the other until the connector is formed.

14. The method according to claim 13, wherein the platform cooling circuit and the airfoil cooling circuit are formed via casting processes; and wherein the connector is formed via a post-casting machining process.

15. The method according to claim 14, wherein the connector comprises a channel that is machined through the inner radial surface of the dovetail such that the channel connects the first coolant inlet and the opening;

further comprising the step of affixing a coverplate over the connector channel, the first coolant inlet, and the opening.

16. The method according to claim 15, wherein the connector is configured to direct substantially all the coolant flowing through the inboard platform return channel to the outboard airfoil supply channel.

17. The method according to claim 16, wherein the cover plate is configured such that substantially all the coolant flowing through the inboard platform return channel is directed into the connector and, then, to the outboard airfoil supply channel.

\* \* \* \* \*